United States Patent
Niwa (10) Patent No.: US 12,351,052 B2
(45) Date of Patent: Jul. 8, 2025

(54) CHARGING FACILITY AND CONTROL METHOD OF CHARGING FACILITY

(71) Applicant: TOYOTA JIDOSHA KABUSHIKI KAISHA, Toyota (JP)

(72) Inventor: Yamato Niwa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 508 days.

(21) Appl. No.: 17/858,508

(22) Filed: Jul. 6, 2022

(65) Prior Publication Data

US 2023/0056926 A1 Feb. 23, 2023

(30) Foreign Application Priority Data

Aug. 18, 2021 (JP) ................. 2021-133237

(51) Int. Cl.
*B60L 53/31* (2019.01)
*B60L 53/60* (2019.01)
*H02J 7/00* (2006.01)

(52) U.S. Cl.
CPC ............... *B60L 53/31* (2019.02); *B60L 53/60* (2019.02); *H02J 7/0042* (2013.01)

(58) Field of Classification Search
CPC .......... B60L 53/31; B60L 53/60; H02J 7/0042
USPC ....................................................... 320/109
See application file for complete search history.

(56) References Cited

U.S. PATENT DOCUMENTS

| | | | |
|---|---|---|---|
| 9,862,284 B2 * | 1/2018 | Kauffmann | B60L 53/12 |
| 11,479,135 B2 * | 10/2022 | Price | B60L 53/305 |
| 2013/0307477 A1 * | 11/2013 | Reinschke | B60L 53/30 |
| | | | 320/109 |
| 2021/0053456 A1 * | 2/2021 | Freeling-Wilkinson | |
| | | | B60L 53/18 |
| 2021/0086633 A1 * | 3/2021 | Kupfer | B60L 53/30 |
| 2021/0252989 A1 * | 8/2021 | Price | B60L 53/31 |
| 2021/0322612 A1 * | 10/2021 | Dean | H02S 40/38 |
| 2023/0081955 A1 * | 3/2023 | Tsuchiya | H02J 7/0042 |
| | | | 320/109 |
| 2024/0140233 A1 * | 5/2024 | Kromrey | B60L 53/16 |
| 2024/0297509 A1 * | 9/2024 | Wolf | B60L 53/66 |

FOREIGN PATENT DOCUMENTS

| | | |
|---|---|---|
| JP | 2011-109807 A | 6/2011 |
| JP | 5475407 B2 | 4/2014 |

* cited by examiner

*Primary Examiner* — Jack Chiang
*Assistant Examiner* — Suchin Parihar
(74) *Attorney, Agent, or Firm* — Sughrue Mion, PLLC

(57) ABSTRACT

In a first state, a control device executes processes including a step of determining whether a predetermined time has elapsed from a previous cleaning time, a step of determining whether a movable portion has been elevated a predetermined number of times from the previous cleaning time, a step of determining whether there is precipitation from the previous cleaning time, a step of executing injection control, and a step of resetting an elapsed time, the number of elevations, and a precipitation flag.

4 Claims, 5 Drawing Sheets

CHARGING FACILITY AND CONTROL METHOD OF CHARGING FACILITY

CROSS-REFERENCE TO RELATED APPLICATION

This application claims priority to Japanese Patent Application No. 2021-133237 filed on Aug. 18, 2021, incorporated herein by reference in its entirety.

BACKGROUND

1. Technical Field

The present disclosure relates to control of a movable charging facility for charging an on-board power storage device.

2. Description of Related Art

A charging facility for charging a power storage device mounted on a vehicle or the like is installed in a parking lot or a sidewalk outside the vehicle. However, the charging facility occupies the installation space, and therefore may interfere with walking or traveling of the vehicle. Therefore, a technique for making the charging facility movable and storing the charging facility underground, for example, is known.

For example, Japanese Unexamined Patent Application Publication No. 2011-109807 (JP 2011-109807 A) discloses a charging pole that can be elevated from the ground and can be lowered so as to be stored underground.

SUMMARY

When the movable charging facility that can be elevated and lowered as described above is not used, the charging facility is stored underground. Therefore, the movable part is likely to become dirty due to intrusion of sand or mud. The part contaminated with sand or mud may cause defects such as rust and corrosion.

The present disclosure has been made to solve the above-mentioned issue, and an object thereof is to provide a charging facility and a control method of the charging facility that suppress the occurrence of defects caused by the intrusion of sand or mud into the movable portion.

A charging facility according to an aspect of the present disclosure is a movable charging facility that is installed in a recess provided on a ground and that is able to charge a power storage device mounted on a vehicle. The charging facility includes: a movable portion including a connecting device that is connectable to the power storage device; an elevating device that elevates and lowers the movable portion such that any of a plurality of states is established, the states including a first state in which the movable portion is stored underground and a second state in which the movable portion is exposed on the ground; an injection device that injects cleaning liquid toward a side surface of the charging facility; and a control device that controls operation of the elevating device and operation of the injection device. The control device controls the injection device such that the injection device injects the liquid toward the side surface of the charging facility when at least either one of predetermined execution conditions is satisfied, the execution conditions being a condition on an elapsed time from a previous injection time of the liquid, a condition on the number of times the movable portion is elevated, and a condition on presence or absence of precipitation.

In this way, the cleaning liquid is injected toward the side surface of the charging facility in the first state when at least either one of the following predetermined execution conditions is satisfied: the elapsed time from the previous injection time of the cleaning liquid; the number of times the movable portion is elevated; and the presence or absence of precipitation. Therefore, the movable portion is cleaned at the timing when the dirt is adhered to some extent, and the dirt due to the sand or mud adhering to the movable portion can be washed away. This makes it possible to suppress the occurrence of defects caused by the intrusion of sand or mud into the movable portion.

In an embodiment, the execution conditions include at least one of a condition that a predetermined time has elapsed from the previous injection time, a condition that the number of times the movable portion has been elevated at and after the previous injection time exceeds a threshold value, and a condition that precipitation has been observed at an installation point of the charging facility at and after the previous injection time.

In this way, the movable portion is cleaned at the timing when the dirt is adhered to some extent, and the dirt due to the sand or mud adhering to the movable portion can be washed away.

In another embodiment, the charging facility further includes a storage unit that stores precipitation in a predetermined area including the installation point of the charging facility as a part of the cleaning liquid. The control device predicts an amount of precipitation stored in the storage unit, and uses a prediction result to set an amount of the liquid to be injected to the charging facility at a time of injection of the liquid.

In this way, control of the injection device can be performed according to the storage amount, so that, for example, when the storage amount is large due to precipitation, a large amount of the cleaning liquid can be injected. Therefore, the dirt due to the sand or mud adhering to the movable portion can be washed away.

In another embodiment, the injection device includes a supply passage connected to an injection port provided at a position on an inner wall of the recess facing the side surface of the charging facility in the first state, and a pump that pumps the liquid into the supply passage.

In this way, the cleaning liquid can be injected to the side surface of the charging facility in the first state from the injection port with the operation of the pump. Therefore, the dirt due to the sand or mud adhering to the movable portion can be washed away.

A charging method of a charging facility according to another aspect of the present disclosure is a charging method of a movable charging facility that is installed in a recess provided on a ground and that is able to charge a power storage device mounted on a vehicle. The charging facility includes a movable portion including a connecting device that is connectable to the power storage device, an elevating device that elevates and lowers the movable portion such that any of a plurality of states is established, the states including a first state in which the movable portion is stored underground and a second state in which the movable portion is exposed on the ground, and an injection device that injects a cleaning liquid toward a side surface of the charging facility. The control method includes: a step of determining whether at least either one of predetermined execution conditions is satisfied, the execution conditions being a condition on an elapsed time from a previous injection time of the liquid, a condition on the number of times the movable portion is elevated, and a condition on presence or absence of precipitation; and a step of controlling the injection device such that the injection device injects the liquid toward the side surface of the charging facility when the at least either one of the execution conditions is satisfied.

According to the present disclosure, a charging facility and a control method of the charging facility that suppress the occurrence of defects caused by the intrusion of sand or mud into the movable portion can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. In the drawings, the same or corresponding portions are denoted by the same reference signs and the description thereof will not be repeated.

Figure 1:
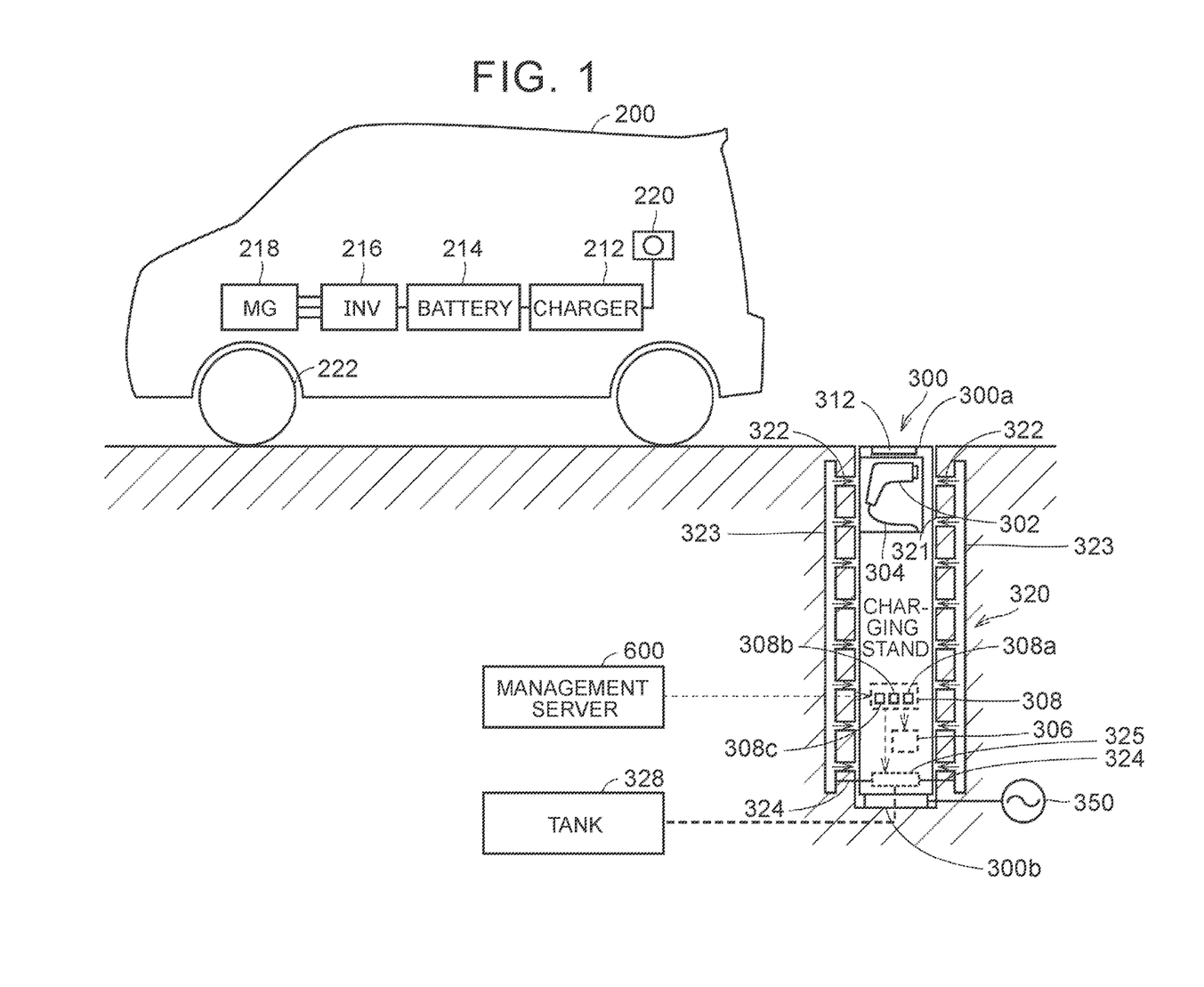
FIG. 1 is a diagram showing an example of a configuration of an electrified vehicle and a charging stand in a state where a movable portion is stored underground.
Figure 2:
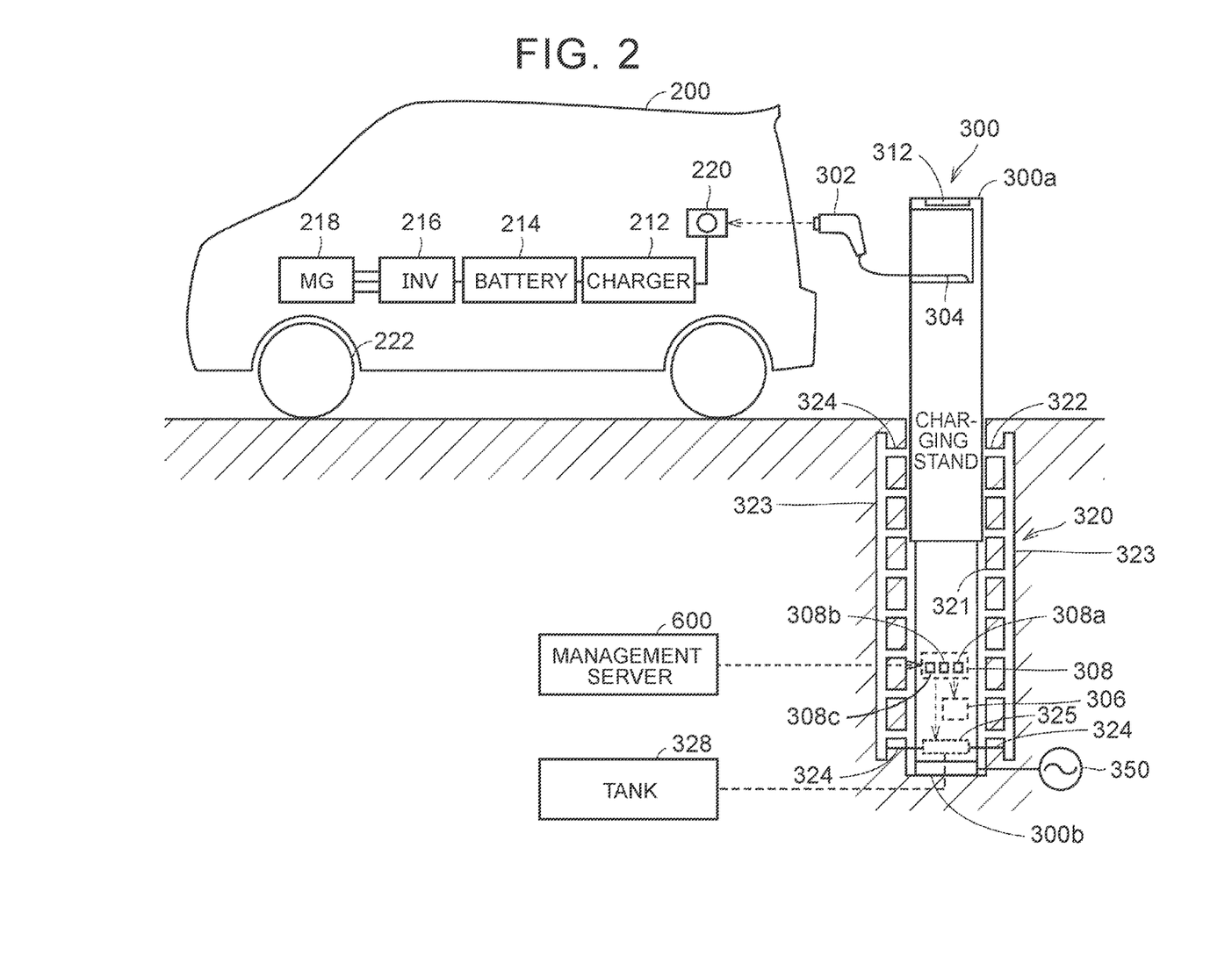
FIG. 2 is a diagram showing an example of the configuration of the electrified vehicle and the charging stand in a state where the movable portion is exposed on the ground.

Hereinafter, a configuration of a charging stand 300 that is a charging facility according to the embodiment of the present disclosure will be described as an example. FIG. 1 is a diagram showing an example of a configuration of an electrified vehicle 200 and the charging stand 300 in a state where a movable portion 300a (that will be described later) is stored underground. FIG. 2 is a diagram showing an example of the configuration of the electrified vehicle 200 and the charging stand 300 in a state where the movable portion 300a is exposed on the ground.

As shown in FIGS. 1 and 2, the charging stand 300 is configured such that the charging stand 300 can be elevated and lowered between a first state (see FIG. 1) in which an upper end of the charging stand 300 is substantially flush with the ground and the movable portion 300a is stored underground, and a second state (see FIG. 2) in which the upper end is elevated to a predetermined position on the ground and the movable portion 300a is exposed on the ground.

The charging stand 300 includes, for example, a cylindrical housing and is installed on the bottom surface of a recess provided on the ground. The recess on the ground is provided so as to have a predetermined gap with an outer peripheral surface (side surface) of the housing of the charging stand 300 and such that the depth is about the same as the vertical length of the charging stand 300 in the first state.

The charging stand 300 includes the movable portion 300a and a fixing portion 300b. A storage space capable of storing a connector 302 is provided in the upper portion of the movable portion 300a. One end of a cable 304 is connected to the connector 302, and the other end of the cable 304 is connected to a power source 350. The power source 350 is, for example, an alternating current (AC) power source configured by a commercial power source or the like. The cable 304 includes, for example, an extensible portion in terms of shape provided with a curl portion or an extensible portion in terms of structure provided with a reeling structure. The cable 304 is configured to be extensible to an inlet 220 of the electrified vehicle 200 parked in the parking space when the connector 302 is taken out.

A precipitation sensor 312 is provided at the upper end of the movable portion 300a. The precipitation sensor 312 is provided at the upper end of the movable portion 300a, for example, and detects the presence or absence of precipitation. The precipitation sensor 312 may be a sensor that detects the amount of precipitation, or may be a sensor that detects the presence or absence of adhesion of water droplets. The precipitation sensor 312 transmits information indicating the presence or absence of precipitation to a control device 308.

The fixing portion 300b is fixed to the bottom surface of the recess provided on the ground. Note that, the fixing portion 300b is not particularly limited to being fixed to the bottom surface of the recess, as long as the fixing portion 300b is fixed to any portion in the recess provided on the ground.

The fixing portion 300b includes an elevating device 306 that elevates and lowers the movable portion 300a in an up-down direction. The elevating device 306 may include, for example, a rack and pinion type mechanism that elevates and lowers the movable portion 300a by rotating a pinion gear meshed with a rack gear fixed to the movable portion 300a using an electric actuator, may include a mechanism using a hydraulic cylinder that elevates and lowers the movable portion 300a by fixing a rod connected to a piston to the movable portion 300a and increasing or decreasing the hydraulic pressure supplied to a cylinder body fixed to the fixing portion 300b, or may include a mechanism that elevates and lowers the movable portion 300a by generating a repulsive force caused by a magnetic force between the movable portion 300a and the fixing portion 300b.

The elevating device 306 raises and lowers the movable portion 300a such that the charging stand 300 is in any of a plurality of states including the first state and the second state. In the present embodiment, the elevating device 306 is configured such that the movable portion 300a is not lowered beyond the position corresponding to the first state by, for example, a stopper mechanism or the like, and is not elevated beyond the position corresponding to the second state.

The charging stand 300 further includes an injection device 320. The injection device 320 includes first supply passages 322, second supply passages 323, third supply passages 324, and a pump 325.

A plurality of injection ports 321 is provided on an inner wall of the recess provided on the ground. In FIGS. 1 and 2, for example, eight injection ports 321 are provided on the inner wall of the recess so as to have a predetermined interval along the height direction. Further, another eight injection ports 321 are provided at positions facing the eight injection ports 321. In FIGS. 1 and 2, 16 injection ports 321 are shown as an example, but the number of injection ports 321 is not particularly limited to 16, and the injection ports 321 are not limited to being provided on the inner wall of the recess so as to have a predetermined interval along the height direction. The injection port 321 may be provided, for example, at a position where dirt is more likely to adhere to the charging stand 300 in the first state than other positions (for example, a position where sand or mud is likely to accumulate such as the upper portion of the housing or the recessed part of the housing of the charging stand 300).

One end of each of the plurality of first supply passages 322 is connected to each of the plurality of injection ports 321. The other end of each of the plurality of first supply passages 322 is connected to the second supply passage 323. One end of the third supply passage 324 is connected to the second supply passage 323. A discharge port of the pump 325 is connected to the other end of the third supply passage 324.

A tank 328 is connected to a suction port of the pump 325. Cleaning liquid is stored in the tank 328. The cleaning liquid may be, for example, water or liquid containing a detergent. The pump 325 operates in response to a control signal from the control device 308.

When the pump 325 operates, the cleaning liquid is sucked from the tank 328, and the sucked liquid is discharged to the third supply passages 324. As shown by the arrows in FIG. 1, the liquid discharged to the third supply passages 324 flows through the second supply passages 323 and the first supply passages 322, and is injected into the recess from the injection ports 321. A drainage port (not shown) is provided at the bottom of the recess provided on the ground, and the liquid injected into the recess is discharged from the inside of the recess to the outside via the drainage port.

The fixing portion 300b further includes the control device 308 that controls the operation of the elevating device 306 and the operation of the injection device 320.

The control device 308 includes a central processing unit (CPU) 308a, a memory 308b composed of a read only memory (ROM), a random access memory (ROM), and the like, and a communication unit 308c capable of communicating with an external device. The control device 308 controls an electric device (for example, the elevating device 306 and the pump 325) provided in the charging stand 300 based on information stored in the memory 308b, information received via the communication unit 308c, and information acquired from the sensors (for example, the precipitation sensor 312). Note that, the controls above are not limited to the configuration in which the process executed by the software is executed by the CPU 300a, and the configuration may be constructed by dedicated hardware (an electronic circuit).

The communication unit 308c is configured to be capable of communicating various types of information and the like with an external device of the charging stand 300. The communication unit 308c is configured to be communicable with, for example, a management server 600. Note that, the communication unit 308c may be configured to be communicable with a mobile terminal (not shown) owned by a user who operates charging at the charging stand 300, or another charging stand 300 in addition to the management server 600.

The communication unit 308c may be configured to be communicable with the management server 600 or another charging stand 300 by, for example, wired communication. Alternatively, the communication unit 308c may be configured to be communicable with the management server 600, the mobile terminal, or another charging stand 300 by, for example, wireless communication.

For example, when an execution condition of elevating control is satisfied, the control device 308 executes the elevating control on the elevating device 306 such that the charging stand 300 is switched from the first state to the second state. The execution condition of the elevating control includes, for example, a condition that the charging stand 300 is in the first state and a condition that an elevating request of the charging stand 300 is made. The elevating request may be received from, for example, the management server 600, the mobile terminal, or another charging stand 300.

For example, when an execution condition of lowering control is satisfied, the control device 308 executes the lowering control on the elevating device 306 such that the charging stand 300 is switched from the second state to the first state. The execution condition of the lowering control includes, for example, a condition that the charging stand 300 is in the second state and a condition that a lowering request of the charging stand 300 is made. The lowering request may be received from, for example, the management server 600, the mobile terminal, or another charging stand 300.

The management server 600 includes a control device, a communication device, and a storage device (none of which are shown). The control device of the management server 600 is composed of a CPU, a memory, and the like. The communication device of the management server 600 is configured to be communicable with the charging stand 300 or other devices such as a mobile terminal via a communication network or directly. The storage device of the management server 600 stores predetermined information. The control device of the management server 600 receives the predetermined information from the electrified vehicle 200 and the charging stand 300 via the communication device, and stores a part or all of the received information in the storage device.

The management server 600 is configured to access an external server or the like managed by organizations such as the Japan Meteorological Agency via the communication device so as to acquire information such as Automated Meteorological Data Acquisition System (AMeDAS) observation data that is periodically provided by the Japan Meteorological Agency, for example. The management server 600 stores the acquired information in the storage device. The information acquired from the external server or the like includes, for example, information related to precipitation at the installation points of a plurality of charging stands (including the charging stand 300) managed by the management server 600.

The information acquired from the external server or the like includes, for example, information related to the amount of precipitation at and before the present time at the installation point of the charging stand 300.

FIGS. 1 and 2 further show an example of the configuration of the electrified vehicle 200 parked in a parking space where the electrified vehicle 200 can be charged by the charging stand 300. As shown in FIGS. 1 and 2, the electrified vehicle 200 includes, for example, a vehicle equipped with a power storage device such as a plug-in hybrid electric vehicle and a battery electric vehicle. Note that, the configuration of the electrified vehicle 200 is not particularly limited to the vehicles listed above, as long as the electrified vehicle 200 has a configuration capable of receiving supply of electric power from the charging stand 300. For example, the electrified vehicle 200 may be a vehicle equipped with a power storage device for external power supply.

The electrified vehicle 200 includes a charger 212, a battery 214, an inverter 216, a motor generator 218, and the inlet 220.

When the AC power is supplied from the inlet 220, the charger 212 converts the supplied AC power into direct current (DC) power and supplies the converted DC power to the battery 214. The battery 214 is charged by operating the charger 212. The charger 212 is controlled by, for example, a control signal from an electronic control unit (ECU) (not shown) of the electrified vehicle 200.

The battery 214 is, for example, a rechargeable electric power storage element, and is typically a secondary battery such as a nickel metal hydride battery or a lithium ion battery containing a liquid or solid electrolyte. Alternatively, the battery 214 may be any power storage device capable of storing electric power, and for example, a large-capacity capacitor may be used instead of the battery 214.

The inverter 216 converts, for example, the DC power of the battery 214 into the AC power and supplies the converted AC power to the motor generator 218. Further, the inverter 216 converts, for example, the AC power (regenerative power) from the motor generator 218 into the DC power and supplies the converted DC power to the battery 214 to charge the battery 214.

The motor generator 218 receives electric power from the inverter 216 and applies a rotational force to drive wheels 222. The drive wheels 222 are each rotated by a rotational force applied by the motor generator 218 to cause the electrified vehicle 200 to travel.

The inlet 220 is provided on the exterior portion of the electrified vehicle 200 together with a cover (not shown) such as a lid. The inlet 220 is a power receiving unit that receives charging power from an external charging facility (for example, the charging stand 300). The inlet 220 has a shape to which the connector 302 of the charging stand 300 can be attached. A contact is included in each of the inlet 220 and the connector 302. When the connector 302 is attached to the inlet 220, the contacts come into contact with each other, and the inlet 220 and the connector 302 are electrically connected. At this time, the battery 214 of the electrified vehicle 200 is in a state where the battery 214 can be charged using the electric power supplied from the charging stand 300.

The charging stand 300 may be installed on a sidewalk adjacent to a plurality of parking spaces in a parking lot, a sidewalk adjacent to a plurality of parking spaces set on a road, or the like. When the electrified vehicle 200 is parked in any of the plurality of parking spaces and the charging stand 300 is in the second state, the user takes out the connector 302 from the charging stand 300 and connects the connector 302 to the inlet 220 of the electrified vehicle 200.

Note that, when the charging stand 300 is in the first state, the user transmits the elevating request to the charging stand 300 using a mobile terminal, or transmits the elevating request to the charging stand 300 via the management server 600. The control device 308 of the charging stand 300 controls the elevating device 306 such that the charging stand 300 is in the second state by receiving the elevating request.

When the movable charging stand 300 that can be elevated and lowered as described above is not used, the charging stand 300 is stored in the recess underground. Therefore, the movable part is likely to become dirty due to intrusion of sand or mud. The part contaminated with sand or mud may cause defects such as rust and corrosion.

Therefore, in the present embodiment, the control device 308 of the charging stand 300 controls the operation of the injection device 320 (specifically, the pump 325) such that the injection device 320 injects the cleaning liquid toward the side surface of the charging stand 300 in the first state when at least either one of the following predetermined execution conditions is satisfied: the elapsed time from the previous injection time of the cleaning liquid; the number of times the movable portion 300a is elevated; and the presence or absence of precipitation.

In this way, since the cleaning liquid is injected toward the side surface of the charging stand 300 in the first state when at least either one of the following predetermined execution conditions is satisfied: the elapsed time from the previous injection time of the cleaning liquid; the number of times the movable portion 300a is elevated; and the presence or absence of precipitation, the movable portion is cleaned at the timing when the dirt is adhered to some extent, and the dirt due to the sand or mud adhering to the movable portion can be washed away. This makes it possible to suppress the occurrence of defects caused by the intrusion of sand or mud into the movable portion.

Figure 3:
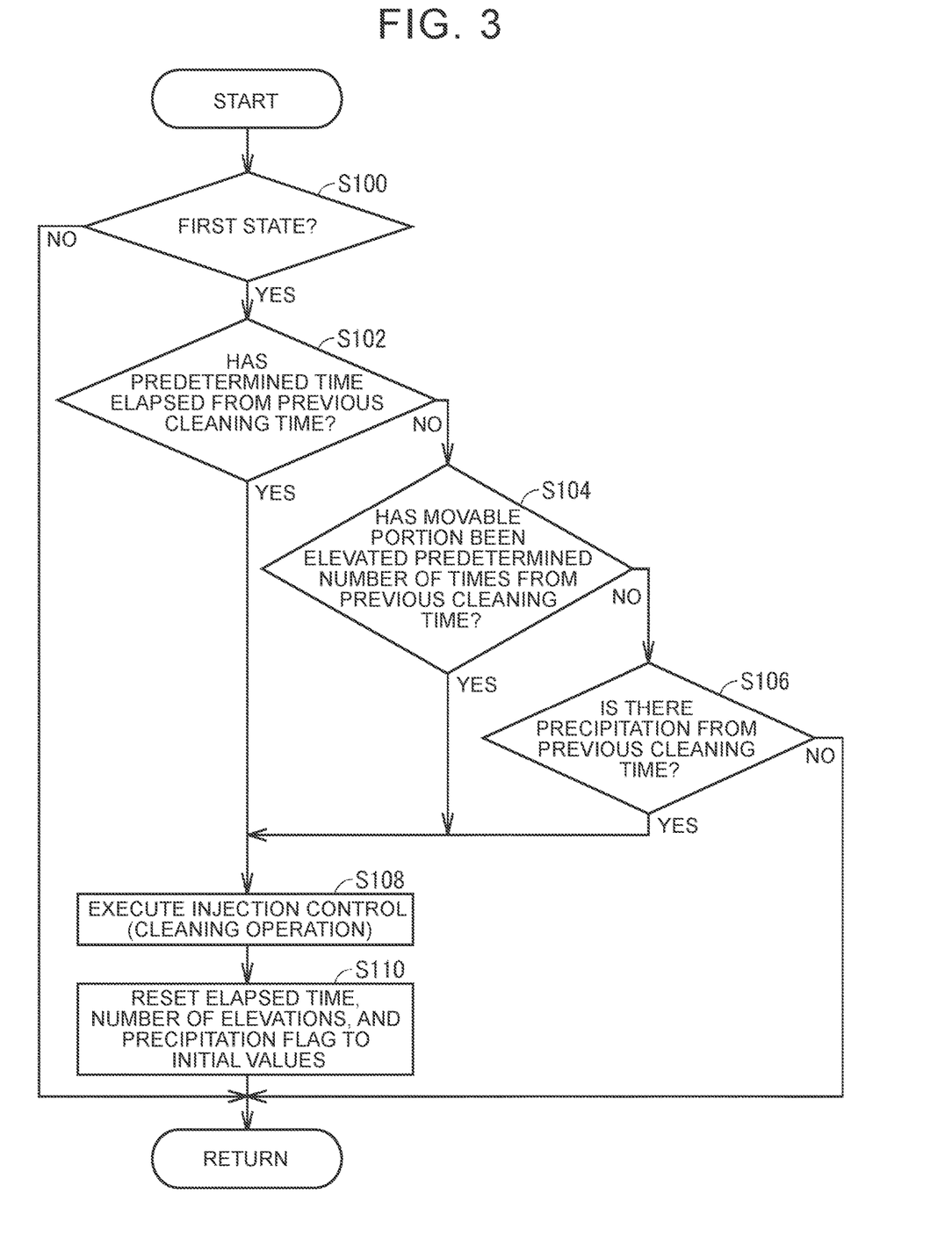
FIG. 3 is a flowchart showing an example of a process executed by a control device of the charging stand.

Hereinafter, an example of a control process executed by the control device 308 will be described with reference to FIG. 3. FIG. 3 is a flowchart showing an example of a process executed by the control device 308. The series of processes shown in this flowchart are repeatedly executed by the control device 308 at predetermined control cycles.

In step (hereinafter, step will be referred to as S) 100, the control device 308 determines whether the charging stand 300 is in the first state. The control device 308 determines that the charging stand 300 is in the first state when an elevating flag is in an OFF state. The elevating flag is set to an ON state when the elevating control is executed, and is set to the OFF state when the lowering control is executed. When the control device 308 determines that the charging stand 300 is in the first state (YES in S100), the process proceeds to S102. Note that, when it is determined that the charging stand 300 is not in the first state (NO in S100), this process is terminated.

In S102, the control device 308 determines whether the predetermined time has elapsed from the previous cleaning time. For example, the control device 308 resets the value counted by a timer (not shown) at the time when the previous cleaning operation (injection control) is performed (hereinafter referred to as the cleaning time) to an initial value (for example, zero). When the value counted by the timer exceeds the value corresponding to the predetermined time, the control device 308 determines that the predetermined time has elapsed from the previous cleaning time. The previous cleaning time means the injection time at which the cleaning liquid was injected in the previous injection control. The injection time is, for example, any time in the period from the injection start time to the injection completion time. When it is determined that the predetermined time has elapsed from the previous cleaning time (YES in S102), the process proceeds to S108. When it is determined that the predetermined time has not elapsed from the previous cleaning time (NO in S102), the process proceeds to S104.

In S104, the control device 308 determines whether the movable portion 300a has been elevated a predetermined number of times from the previous cleaning time. For example, the control device 308 resets the count value for counting the number of elevations of the movable portion 300a to the initial value (for example, zero) at the time when the previous cleaning operation is performed. The control device 308 increases the count value by a predetermined value (for example, one) each time the movable portion 300a of the charging stand 300 in the first state is elevated when the execution condition of the elevating control is satisfied. When the count value exceeds a value indicating the predetermined number of times, the control device 308 determines that the movable portion 300*a* has been elevated the predetermined number of times from the previous cleaning time. When it is determined that the movable portion 300*a* has been elevated the predetermined number of times from the previous cleaning time (YES in S104), the process proceeds to S108. When it is determined that the movable portion 300*a* has not been elevated the predetermined number of times from the previous cleaning time (NO in S104), the process proceeds to S106.

In S106, the control device 308 determines whether there is precipitation from the previous cleaning time. The control device 308 sets a precipitation flag to an ON state when the control device 308 receives, from the precipitation sensor 312, information indicating that there is precipitation at and after the time when the previous cleaning operation is performed. Alternatively, the control device 308 may set the precipitation flag to the ON state when the control device 308 receives, from the management server 600, information indicating that there has been precipitation at the point where the charging stand 300 is installed at and after the time when the previous cleaning operation is performed. When it is determined that there is precipitation from the previous cleaning time (YES in S106), the process proceeds to S108. When it is determined that there is no precipitation from the previous cleaning time (NO in S106), this process is terminated.

In S108, the control device 308 executes the injection control (that is, cleaning operation). Specifically, the control device 308 operates the pump 325 to suck the cleaning liquid in the tank 328 and to inject the cleaning liquid from the injection ports 321 to the side surfaces of the charging stand 300 facing the injection ports 321, via the third supply passages 324, the second supply passages 323, and the first supply passages 322. The control device 308 may, for example, continue the injection until a predetermined time elapses and stop the injection when the predetermined time has elapsed, or alternatively, the control device 308 may continue the injection until the total amount of the injection amount reaches a predetermined amount and stop the injection when the total amount of the injection amount reaches the predetermined amount.

In S110, the control device 308 resets the elapsed time, the number of elevations, and the precipitation flag to the initial values. That is, the control device 308 sets, for example, the count value of the elapsed time to the initial value (for example, zero), the count value of the number of elevations to the initial value (for example, zero), and the precipitation flag to the initial value (for example, the value indicating the OFF state).

An example of the operation of the control device 308 in the present embodiment based on the above structure and the flowchart will be described.

For example, assume that the previous cleaning operation for the charging stand 300 is completed. After the cleaning operation is completed, the count value of the elapsed time from the time when the cleaning operation is performed is reset to the initial value of zero, so that the counting is started from the initial value. In addition, the count value of the number of elevations of the movable portion 300*a* is reset to the initial value of zero, and the precipitation flag is reset to the OFF state.

When the charging stand 300 is in the first state (YES in S100), it is determined whether the predetermined time has elapsed from the time when the previous cleaning operation is performed (S102), and when the predetermined time has not elapsed (NO in S102), it is determined whether the movable portion 300*a* has been elevated the predetermined number of times from the time when the previous cleaning operation is performed (S104). When the movable portion 300*a* has not been elevated the predetermined number of times (NO in S104), it is determined whether there is precipitation at and after the time when the previous cleaning operation is performed (S106).

For example, when the predetermined time has elapsed from the time when the previous cleaning operation is performed (YES in S102), the injection control is executed (S108).

Therefore, the cleaning liquid is injected from each of the plurality of injection ports 321 to the side surface of the charging stand 300. By injecting the cleaning liquid to the side surface of the charging stand 300, dirt such as sand and mud adhering to the side surface of the charging stand 300 (for example, the movable portion 300*a*) is washed away. Dirt that has been washed away from the charging stand 300 is discharged to the outside of the recess from the drain port on the bottom surface of the recess, for example. When the cleaning is completed, the elapsed time, the number of elevations, and the precipitation flag are reset to the initial values (S110).

Alternatively, even when the predetermined time has not elapsed since the previous cleaning operation is performed (NO in S102), when the movable portion 300*a* has been elevated the predetermined number of times, the injection control is executed (S108). Further, even when the movable portion 300*a* has not been elevated the predetermined number of times, when there is precipitation, the injection control is executed (S108). Therefore, the injection control is executed at the timing when dirt such as sand or mud is adhered to the side surface of the charging stand 300, and thus the adhered dirt is washed away.

As described above, with the charging stand 300 that is the charging facility according to the present embodiment, since the cleaning liquid is injected toward the side surface of the charging stand 300 in the first state when at least either one of the following predetermined execution conditions is satisfied: the elapsed time from the previous injection time; the number of times the movable portion 300*a* is elevated; and the presence or absence of precipitation, the movable portion is cleaned at the timing when the dirt is adhered to some extent, and the dirt due to the sand or mud adhering to the movable portion can be washed away. This makes it possible to suppress the occurrence of defects such as rust and corrosion caused by the intrusion of sand or mud into the movable portion. Therefore, a charging facility and a control method of the charging facility that suppress the occurrence of defects caused by the intrusion of sand or mud into the movable portion can be provided.

Hereinafter, modifications will be described. In the above-described embodiment, the power source 350 has been described as an AC power source. However, the power source 350 may be a DC power source. In this case, the electrified vehicle 200 may have a configuration in which the charger 212 is omitted, for example.

Further, in the above-described embodiment, the configuration in which the connector 302 is stored in the storage space provided in the upper portion of the movable portion 300*a* has been described as an example. However, for example, a socket may be provided to be exposed on a side surface of the upper portion of the movable portion 300*a*. In this way, the user can charge the battery 214 mounted on the electrified vehicle 200 by connecting the socket of the charging stand 300 to the inlet 220 of the electrified vehicle 200 using a separately prepared charging cable.

Further, in the above-described embodiment, the case where the housing of the charging stand 300 has a cylindrical shape has been described as an example. However, the shape of the housing is not particularly limited to the cylindrical shape, as long as the shape of the housing has a shape that allows elevating and lowering operations. For example, the housing of the charging stand 300 may have a rectangular shape.

Further, in the above-described embodiment, the case where the cleaning liquid is stored in the tank 328 has been described as an example. However, for example, the tank 328 may further include a storage unit for storing precipitation in a predetermined area including the installation point of the charging stand 300 as part of the cleaning liquid. In addition, the control device 308 may predict, for example, the amount of precipitation stored in the storage unit and use the prediction result to set the amount of liquid to be injected to the charging stand 300 at the time of injecting the cleaning liquid.

Figure 4:
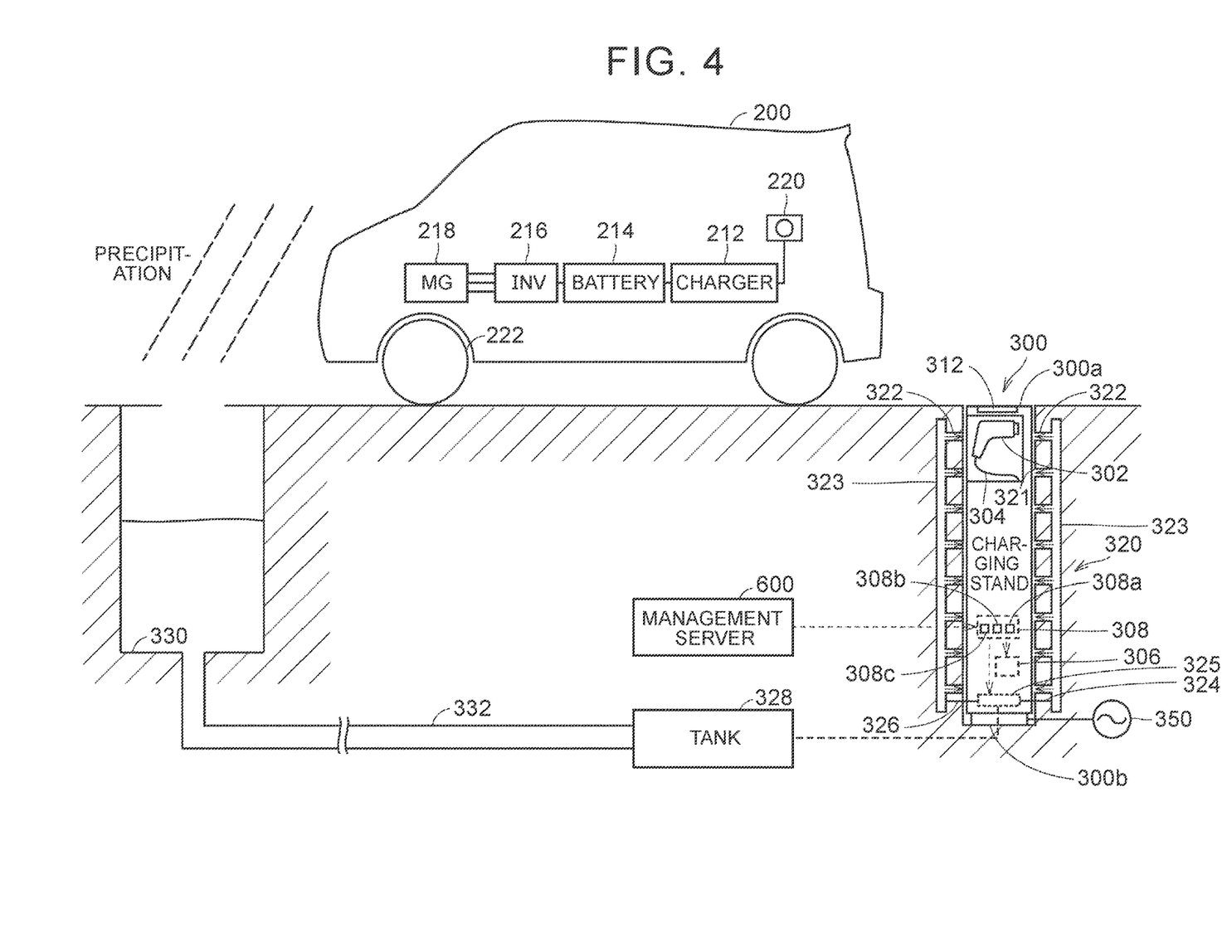
FIG. 4 is a diagram illustrating an example of a configuration of the charging stand in a modification.

FIG. 4 is a diagram illustrating an example of a configuration of the charging stand 300 in the modification. In FIG. 4, the same reference signs are assigned to the same configurations as those in FIG. 1. Therefore, the detailed description of those configurations will not be repeated. As shown in FIG. 4, a storage unit 330 is connected to the tank 328. The storage unit 330 is a rainwater storage tank installed underground, and is in a communicating state with an opening provided in the ground. Therefore, for example, water accumulated on the ground due to precipitation flows to the opening, flows into the storage unit 330 from the opening, and is stored in the storage unit 330. One end of a connection passage 332 is connected to the bottom of the storage unit 330. The tank 328 is connected to the other end of the connection passage 332. Therefore, the water stored in the storage unit 330 can be distributed to the tank 328. Note that, for example, a pump (not shown) may be used to distribute the water from the storage unit 330 to the tank 328, or the connection passage 332 may be configured to distribute the water by the weight of the water.

The control device 308 receives the amount of precipitation at the installation point of the charging stand 300 from the management server 600, predicts the amount of water stored in the storage unit 330 using the received amount of precipitation, and sets the amount of liquid to be injected to the charging stand 300 at the execution time of the injection control using the prediction result.

Figure 5:
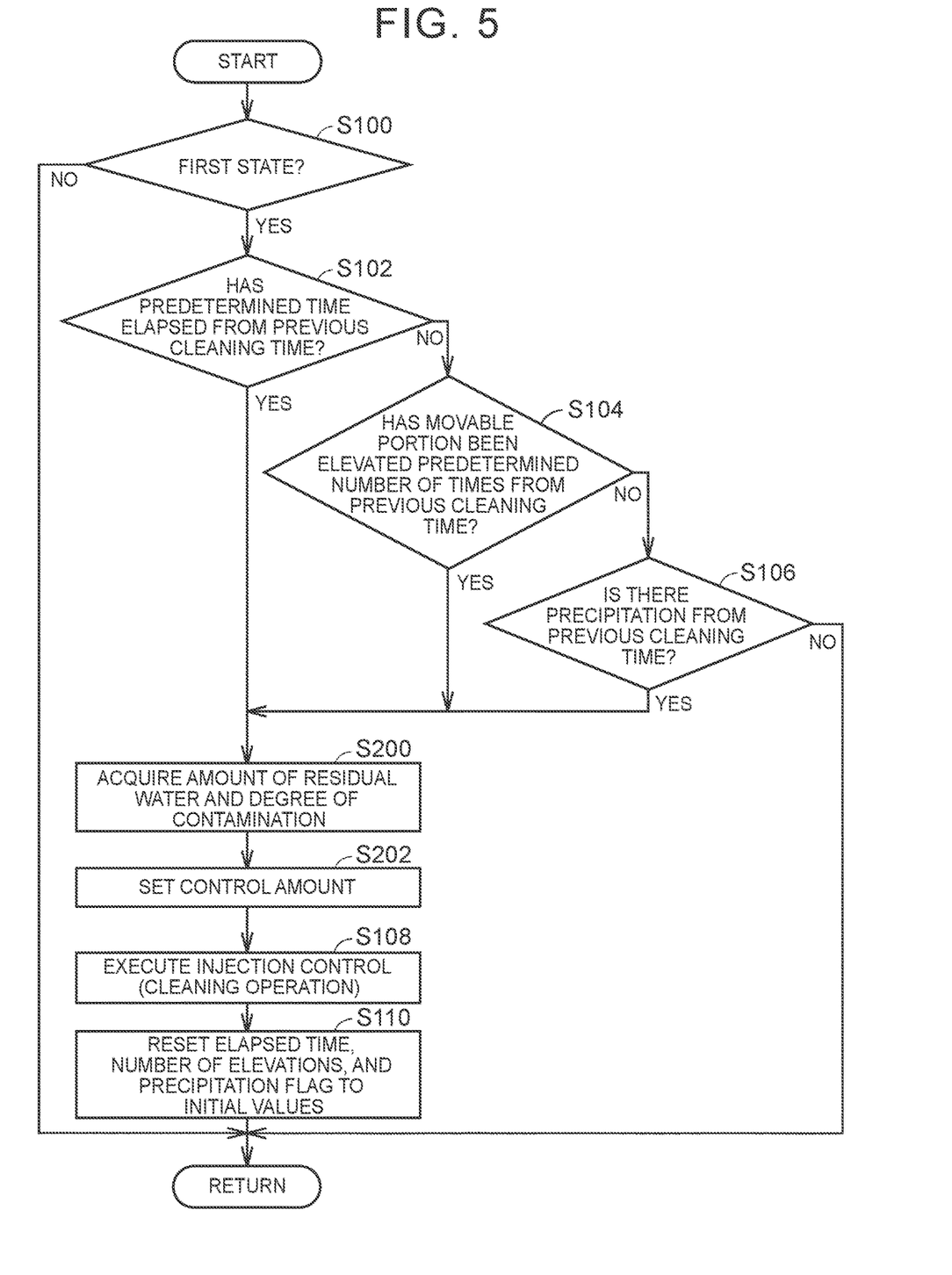
FIG. 5 is a flowchart showing an example of a process executed by the control device of the charging stand in the modification.

FIG. 5 is a flowchart showing an example of a process executed by the control device 308 of the charging stand 300 in the modification.

The flowchart in FIG. 5 is different from the flowchart in FIG. 3 in that the flowchart in FIG. 5 further includes a process in S200 and a process in S202. The other processes are the same as the processes shown in the flowchart in FIG. 3, except for the cases described below, and the same step numbers are assigned. Therefore, detailed descriptions thereof will not be repeated.

When it is determined that the predetermined time has elapsed from the previous cleaning time (YES in S102), that the movable portion 300*a* has been elevated the predetermined number of times from the previous cleaning time (YES in S104), or that there is precipitation from the previous cleaning time (YES in S106), the process proceeds to S200.

In S200, the control device 308 acquires the amount of residual water and the degree of contamination. For example, the control device 308 receives the amount of precipitation at the installation point of the charging stand 300 from the management server 600 as described above, and predicts the amount of water stored in the storage unit 330 using the received amount of precipitation. For example, the control device 308 acquires the ratio of the amount of precipitation stored in the storage unit through an experiment or the like, and predicts the amount of water stored in the storage unit 330 by using the amount of precipitation and the ratio. For example, the control device 308 calculates the amount of change in the storage amount using the amount of precipitation from the previous cleaning time and the ratio thereof, and adds the calculated amount of change to the storage amount at the previous cleaning time to predict the amount of water stored in the storage unit 330. Further, the control device 308 acquires the elapsed time from the previous cleaning time, the number of elevations of the movable portion 300*a* from the previous cleaning time, and the presence or absence of precipitation at and after the previous cleaning time as the degree of contamination.

In S202, the control device 308 sets the control amount (specifically, the operation amount of the pump 325) in the injection control. For example, when the storage amount is large, the control device 308 increases the operation amount of the pump 325 as compared with the case where the storage amount is small, and sets the control amount so as to increase the injection amount. Alternatively, when the degree of contamination is large, the control device 308 increases the operation amount of the pump 325 as compared with the case where the degree of contamination is small, and sets the control amount so as to increase the injection amount. In S108, the control device 308 executes the injection control according to the set control amount. The injection control is as described above, so detailed description thereof will not be repeated.

An example of the operation of the control device 308 in the modification based on the above flowchart will be described.

When the charging stand 300 is in the first state (YES in S100), it is determined whether the predetermined time has elapsed from the time when the previous cleaning operation is performed (S102), and when the predetermined time has not elapsed (NO in S102), it is determined whether the movable portion 300*a* has been elevated the predetermined number of times from the time when the previous cleaning operation is performed (S104). When the movable portion 300*a* has not been elevated the predetermined number of times (NO in S104), it is determined whether there is precipitation at and after the time when the previous cleaning operation is performed (S106).

For example, when the predetermined time has elapsed from the time when the previous cleaning operation is performed (YES in S102), the amount of residual water in the storage unit 330 and the degree of contamination are acquired (S200), and the control amount in the injection control is set using the amount of residual water and the degree of contamination that have been acquired (S202). Then, the injection control is executed according to the set control amount (S108).

In this way, for example, when the amount of residual water in the storage unit 330 is large, the injection amount is increased as compared with the case where the amount of residual water is small, so that a large amount of dirt adhering to the side surface of the charging stand 300 can be washed away. Further, when the degree of contamination is large, the injection amount is increased as compared with the case where the degree of contamination is small, so that a large amount of dirt adhering to the side surface of the charging stand 300 can be washed away. In this modification, the case where the amount of water stored in the storage unit 330 is predicted from the amount of precipitation has been described. However, for example, the amount of water stored in the storage unit 330 (the amount of residual water) may be detected using a liquid level sensor or the like provided in the storage unit 330.

Further, in the above-described embodiment, the case where the control device 308 acquires weather information from the management server 600 has been described as an example. However, for example, the weather information at the installation point of the charging stand 300 may be directly acquired from the external server of the Japan Meteorological Agency, the weather information at the installation point of the charging stand 300 may be acquired from a website on the Internet that discloses the precipitation status, or the weather information at the installation point of the charging stand 300 may be acquired from a mobile terminal moving around the charging stand 300 or another charging stand 300.

Further, in the above-described embodiment, the case where the weather information is acquired from the precipitation sensor 312 and the management server 600 has been described. However, when a first determination result of the presence or absence of precipitation using the precipitation sensor 312 and a second determination result of the presence or absence of precipitation using information acquired from the management server 600 are different, the presence or absence of precipitation may be determined according to a priority set in advance for the first determination result and the second determination result.

Further, in the above-described embodiment, the case where it is determined whether a predetermined execution condition is satisfied when the charging stand 300 is in the first state has been described. However, for example, when the charging stand 300 is in the second state, it is possible to set the charging stand 300 in the first state, and the predetermined execution condition is satisfied, the injection control may be executed after the charging stand 300 is switched from the second state to the first state.

Further, in the above-described embodiment, the case where it is determined whether the predetermined execution condition is satisfied when the charging stand 300 is in the first state in order to remove dirt from the outer peripheral portion of the movable portion 300a has been described. However, for example, when it is easier to wash away dirt due to sand or mud when the injection control is executed with the charging stand 300 in the second state than in the case where the charging stand 300 is in the first state, it may be determined whether the predetermined execution condition is satisfied when the charging stand 300 is in the second state, and the injection control may be executed when the execution condition is satisfied.

Further, in the above-described embodiment, the case where the injection from the plurality of injection ports 321 is performed by the operation of the pump 325 has been described as an example. However, for example, an injection valve may be provided in each of the plurality of injection ports 321 and the control device 308 may be able to control the operation of opening and closing the injection valves. In this way, the injection control can be individually performed for the plurality of injection ports 321.

Further, in the above-described embodiment, the case where the injection control is executed when there is precipitation at and after the previous cleaning time has been described. However, the control device 308 may execute the injection control after a predetermined time has elapsed from the time when the precipitation stopped, or may execute the injection control during the precipitation.

In addition, the above-mentioned modifications may be carried out by appropriately combining all or a part thereof. The embodiment disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A movable charging facility that is installed in a recess provided on a ground and that is able to charge a power storage device mounted on a vehicle, the charging facility comprising:
   a movable portion including a connecting device that is connectable to the power storage device;
   an elevating device that elevates and lowers the movable portion such that any of a plurality of states is established, the states including a first state in which the movable portion is stored underground and a second state in which the movable portion is exposed on the ground;
   an injection device that injects cleaning liquid toward a side surface of the charging facility;
   a storage unit that stores precipitation in a predetermined area including the installation point of the charging facility as a part of the cleaning liquid; and
   a control device that is configured to
      control operation of the elevating device and operation of the injection device,
      control the injection device such that the injection device injects the cleaning liquid toward the side surface of the charging facility when at least either one of predetermined execution conditions is satisfied, the execution conditions being a condition on an elapsed time from a previous injection time of the cleaning liquid, a condition on the number of times the movable portion is elevated, and a condition on presence or absence of precipitation,
      predict an amount of precipitation stored in the storage unit, and
      set an amount of the cleaning liquid to be injected to the charging facility at a time of injection of the cleaning liquid based on a prediction result.

2. The charging facility according to claim 1, wherein the execution conditions include at least one of a condition that a predetermined time has elapsed from the previous injection time, a condition that the number of times the movable portion has been elevated at and after the previous injection time exceeds a threshold value, and a condition that precipitation has been observed at an installation point of the charging facility at and after the previous injection time.

3. The charging facility according to claim 1, wherein the injection device includes
   a supply passage connected to an injection port provided at a position on an inner wall of the recess facing the side surface of the charging facility in the first state, and
   a pump that pumps the cleaning liquid into the supply passage.

4. A control method of a charging facility, the control method being a control method of a movable charging facility that is installed in a recess provided on a ground and that is able to charge a power storage device mounted on a vehicle, the charging facility including a movable portion including a connecting device that is connectable to the power storage device, an elevating device that elevates and lowers the movable portion such that any of a plurality of states is established, the states including a first state in which the movable portion is stored underground and a second state in which the movable portion is exposed on the ground, an injection device that injects a cleaning liquid toward a side surface of the charging facility, and a storage unit that stores precipitation in a predetermined area including the installation point of the charging facility as a part of the cleaning liquid, the control method comprising:

determining whether at least either one of predetermined execution conditions is satisfied, the execution conditions being a condition on an elapsed time from a previous injection time of the cleaning liquid, a condition on the number of times the movable portion is elevated, and a condition on presence or absence of precipitation;

predicting an amount of precipitation stored in the storage unit;

setting an amount of the cleaning liquid to be injected to the charging facility at a time of injection of the cleaning liquid based on a prediction result; and     controlling the injection device such that the injection device injects the cleaning liquid toward the side surface of the charging facility when the at least either one of the execution conditions is satisfied.

\* \* \* \* \*